Oct. 28, 1947.   G. L. MAGOUN   2,429,887
ALKYLATING AROMATIC COMPOUND
Filed Oct. 17, 1942
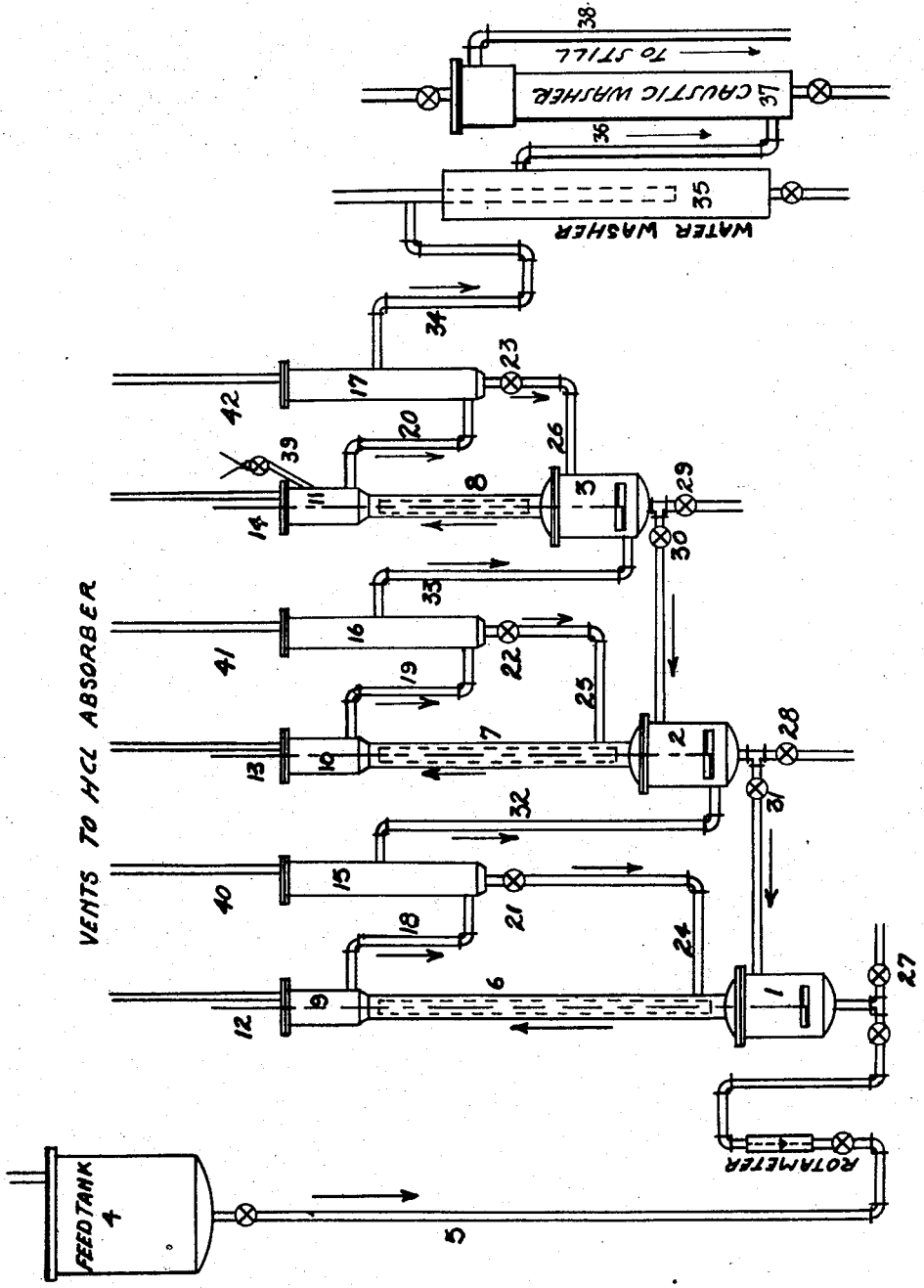
GEORGE L. MAGOUN
INVENTOR
BY Robert L. Sibley
ATTORNEY Patented Oct. 28, 1947

2,429,887

UNITED STATES PATENT OFFICE 2,429,887

ALKYLATING AROMATIC COMPOUNDS

George L. Magoun, Nitro, W. Va., assignor to Monsanto Chemical Company, St. Louis, Mo., a corporation of Delaware Application October 17, 1942, Serial No. 462,339

3 Claims. (Cl. 260—671)

The present invention relates to an improved method of alkylating aromatic compounds. More particularly it relates to an improvement in the application of the Friedel-Crafts type process for introducing hydrocarbon side chains into aromatic compounds.

The alkylation of aromatic compounds in the presence of a catalyst of the Friedel-Crafts type has found widespread industrial application. However, the gradual lowering of the effectiveness of the catalyst during use has been a persistent source of difficulty. The efficiency of the catalyst, usually anhydrous aluminum chloride, never remains constant but gradually diminishes with use. Furthermore, many substances such as sulfur and sulfur compounds, water and certain metals "poison" the catalyst and abnormally shorten its effective life. Since these poisons usually can not be removed economically an added economic burden must be borne by the catalyst so that its cost per unit of product assumes an important place in the process. While various suggestions have been put forward for extending the life of the catalyst, it is of course necessary to maintain a relatively high overall effectiveness. Consequently, the discarded used catalyst usually possesses appreciable activity.

An object of this invention is to provide an essentially continuous process for alkylating aromatic compounds. Another object is to provide a process for alkylating aromatic compounds in the presence of a Friedel-Crafts catalyst wherein the useful life of the catalyst is prolonged. A further object is to provide a process of alkylating wherein a Friedel-Crafts catalyst can be used until completely exhausted. A further object is to provide a process wherein a Friedel-Crafts catalyst is protected from contamination and poisoning. A still further object is to increase the production of alkylated product per unit of alkylating capacity. Other objects are to eliminate incomplete alkylation and to decrease polymerization of the alkylating agent by a Friedel-Crafts catalyst. Still other objects will in part be apparent and in part particularly pointed out in the detailed description which follows.

In accordance with the present invention the alkylation of aromatic compounds is effected by contacting the alkylating agent in the presence of the aromatic compound with successive portions of catalyst. The process is made essentially continuous by passing a mixture of the alkylating agent and aromatic compound through the catalyst in successive catalyst chambers in series. A Friedel-Crafts type catalyst is especially suited for use in the process. The catalyst is contained in a series of separate reaction units and the aromatic compound and alkylating agent are introduced first into the reactor containing the catalyst of lowest activity and then through catalyst of increasing activity. The alkylating liquor is intimately and thoroughly contacted with the catalyst in each chamber but each time of contact is of relatively short duration.

A diagrammatic representation of the arrangement of the apparatus and the flow of materials in one adaptation of the process is shown by the single figure of the attached drawing.

For purposes of illustration the process will be explained with reference to the alkylation of benzene with a higher alkyl chloride. The alkyl chloride used in this particular operation was obtained by chlorinating a kerosene fraction boiling within the range of 200–250° C. and corresponded essentially to tridecyl chloride. 35 parts by weight of chlorine were reacted with 170 parts by weight of the kerosene at 30–35° C. and the chlorinated product used directly in the process. To operate the process, the reaction chambers 1, 2 and 3 are charged with anhydrous aluminum chloride and benzene to from ⅓ to ½ capacity and benzene and chlorinated kerosene in the ratio of from three to five molecular proportions of benzene to one molecular proportion of chlorinated kerosene charged into the feed tank 4. The operation is initiated by passing the benzene-chlorinated kerosene mixture through feed line 5 into reactor 1 and thence through the system. After contacting the catalyst in reactor 1, the partially reacted mixture passes up through the header 6 carrying with it some entrained catalyst. It then passes through line 18 into settling tower 15 from which the catalyst returns to the reactor through line 24 and the catalyst free liquor overflows out through line 32 into the second reactor 2 and the cycle repeated in a second, and finally in a third unit similar to the first. Valves 21, 22 and 23 beneath the settling tower may either be open or kept closed and the catalyst fed back into the reactors intermittently. The product flowing out through line 34 is free of alkyl chlorides and consists of the alkylated product and unreacted hydrocarbons saturated with hydrogen chloride. The alkylated mixture passes first through a water washer 35 and then out line 36 and through a caustic washer 37 and finally to a still through line 38. The pure alkyl benzene is obtained by fractionating the washed alkylation mixture.

When the catalyst in the first reactor is completely exhausted, a condition easily determined by the cessation of hydrogen chloride evolution through vents 12 and 40, the spent catalyst is drawn off through valve 21 and discarded. The catalyst in reactor 2 is moved forward into reactor 1 by opening valve 31 and the catalyst in reactor 3 is moved forward into reactor 2 by opening valve 30. Fresh catalyst is charged into reactor 3 through the catalyst feed line 39. Operation is again resumed by continuing the flow through the system of the chlorinated kerosene-benzene mixture. When the catalyst in the first reactor is again exhausted, operation is interrupted while the spent catalyst is discharged and the catalyst again moved forward from the other reactors as described. Thus, no catalyst is discarded until it is completely exhausted and as compared to the batch process greatly increased throughput per gallon of alkylator capacity is attained.

The operation can be made continuous by adding a fourth unit and employing a circulating pump to move the liquor forward. In this case the necessity of moving the catalyst complex is eliminated. The reaction chambers can then be on the same level instead of on different levels as shown in the diagram to permit gravity feed. However, a more complicated system of valves and piping is required since it must be possible to introduce the fresh liquor into each unit in rotation and to withdraw the alkylated product either into another unit in series or into the wash towers. In this case operation is not temporarily interrupted when the catalyst in number 1 reactor is exhausted. Instead, the number 1 unit is simply isolated from the system, the fresh liquor introduced into the number 2 reactor and a fourth unit containing fresh catalyst introduced between the number 3 reactor and the wash towers. The catalyst from number 1 is then drawn off and discarded and charged with fresh catalyst so as to be ready for use when the catalyst in number 2 reactor is exhausted. Obviously headers 6, 7 and the header of the fourth unit must be fitted with a catalyst feed, for example a feed line such as shown on header 8 in the diagram. The number 1 reactor is again inserted in the system but now becomes the third unit through which the liquor passes, the alkylated mixture flowing from it to the wash towers. Preferably the water washing in 35 is continuous. That is to say, fresh water is continuously introduced and spent water continuously drawn off, the washed liquid continuously flowing out line 36 and through the caustic washer.

While the process can be operated with only two units, it is then less efficient for it has been found that reaction begins in the third reactor before the catalyst in the first reactor is entirely exhausted. Conversely, the number of reactors can be increased as desired. Of course, increasing the number of units beyond the number in which reaction could possibly take place, serves no useful purpose. Since catalytic poisons are removed from the liquor by the catalyst complex even after the catalytic activity has disappeared, exhausted catalyst can be maintained in the first unit solely to remove impurities and catalytic poisons, the actual alkylation being carried out in subsequent units, preferably three.

Glass and glass lined equipment are preferred but other materials of construction resistant to hydrogen chloride and aluminum chloride can be used. In this connection it should be noted that the aforedescribed process was operated at room temperature whereas for best results the batch process should be run at about 50° C. The lower temperature reduces the quantity of benzene carried out by the HCl vapor and has other advantages.

While the new process is particularly adapted for carrying out a Friedel-Crafts reaction wherein a metallic halide catalyst complex is used, other alkylating catalysts may be used as for example sulfuric acid, activated bleaching earths and the like.

It will be appreciated that although aluminum chloride is charged into the system in the specific operation described, the actual catalyst is believed to be an organo-aluminum chloride complex.

As pointed out above the use of a series of reaction units permits a rapid rate of flow of reactants through the system without introducing the danger of incomplete alkylation. Furthermore, the reaction can be controlled and regulated much more closely than in a batch process. Where mono alkylation is desired the short time of contact with the catalyst results in lower dialkylation as well as lower decomposition and/or polymerization of the reactants by the aluminum chloride. The following table compares the present process to the batch process in which the chlorinated kerosene-benzene ratio was substantially the same as in the operation described in detail above.

Table

| | Percent High Boiling Residue (ave.) | Catalyst required for 100 parts by weight of alkyl benzene, parts by wt. |
|---|---|---|
| Batch process | 29.0 | 5.8 |
| Present process | 17.9 | 3.0 |

Obviously, the reduction in the amount of catalyst by nearly 50% and the high boiling residue (a useless by-product) by nearly 40% effect important savings.

Similar results and savings were obtained with other chlorinated kerosene fractions as the alkylating agent. For example a kerosene fraction boiling at 160–195° C. (essentially corresponding to decane) was chlorinated to form mono chlor decanes and a fraction boiling at 190 to 235° C. (essentially corresponding to dodecane) was mono chlorinated and reacted with benzene as described above. The saving and advantages over the batch process were similar to those described. Likewise other liquid alkylating agents may be used as for example n-amyl chloride, isoamyl chloride, tertiary butyl chloride, isopropyl chloride, isononyl chloride, tetradecyl chloride and the like. The pure alkyl chloride may be used or mixtures of alkyl chlorides either directly or diluted by inert diluents as for example mixtures of alkyl chlorides and kerosene obtained by partially chlorinating kerosene fractions. Since the alkyl halides form hydrogen halide as a by-product the latter will be present throughout the system and by running the stirrer shafts 9, 10 and 11 through the headers an even, uniform flow of hydrogen halide is assured. However, this is not essential and the process has been satisfactorily operated, using off center stirring, the shafts being inserted through the dome of the reactors.

Lower olefines also give good results in the process. However, slight alterations in the equipment and arrangement thereof must be made in order to adapt the process to gaseous alkylating agents such as ethylene. The ethylene usually diluted with air or other inert diluent is introduced at any point desired into the feed line 5 and a mixture of ethylene and benzene fed into the first reactor which contains catalyst and benzene saturated with hydrogen chloride. Unreacted ethylene is withdrawn through vent 12 which is now connected to number 2 reactor as for example through valve 28 and is pumped to the second reactor where the cycle is repeated. The second reactor is similarly connected to the third reactor where the last traces of unreacted ethylene are brought into reaction. Thus, vent 13 may be connected to reactor 3 through valve 29 and any ethylene still unreacted led through the catalyst and benzene in reactor 3. Any residual gas is simply vented through vent 14. Operating in this manner a ratio of ethyl benzene to diethyl benzene of substantially 95:5 was obtained.

Other aromatic compounds can be alkylated by the present process including toluene, xylene, naphthalene, diphenyl, chlordiphenyl, monochlor benzene, ortho dichlor benzene and phenol. Solid aromatics are dissolved in a suitable solvent and passed through the system in the form of their solutions.

The invention is not limited to the specific embodiments described above. For example the ratio of aromatic compound and alkylating agent fed into the system can be widely varied. For mono alkylation the aromatic compound is preferably kept in molecular excess but the reverse is true where more highly alkylated products are desired. The invention is limited solely by the claims attached hereto as part of the present specification.

What is claimed is:

1. The process of carrying out Friedel-Crafts alkylations of aromatic compounds so as to conserve catalyst with reactants tending to deactivate the catalyst which comprises conducting partial reactions in separate units by passing concurrently a liquid mixture of alkyl chloride and aromatic hydrocarbon through at least three successive stationary portions of aluminum chloride catalyst of increasing catalytic activity, the aluminum chloride being rendered stationary with respect to the adjacent portions by separating the catalyst from the liquors leaving each unit and recycling the catalyst through the same unit, and intermittently withdrawing spent catalyst from the first unit after it is completely exhausted and charging with partially spent catalyst from the next succeeding unit, each unit except the last being charged with the catalyst from the succeeding unit, introducing fresh catalyst into the final unit and resuming operations.

2. The process of carrying out the Friedel-Crafts mono alkylation of benzene so as to conserve catalyst with reactants which tend to deactivate the catalyst which comprises conducting partial reactions in separate units by passing a solution in benzene of chlorinated kerosene in the ratio of from three to five molecular proportions of benzene to one molecular proportion of chlorinated kerosene through three successive stationary portions of aluminum chloride catalyst of increasing catalytic activity, the aluminum chloride being rendered stationary with respect to the adjacent portions by separating the catalyst from the liquors leaving each unit and recycling the catalyst through the same unit, and intermittently withdrawing spent catalyst from the first unit after it is completely exhausted, transferring the catalyst from the second unit to the first unit and from the third unit to the second unit, introducing fresh catalyst into the third unit and resuming operations.

3. The process of carrying out the Friedel-Crafts mono ethylation of benzene so as to conserve catalyst with reactants which tend to deactivate the catalyst which comprises conducting partial reactions in separate units by passing concurrently benzene and ethylene through three successive stationary portions of aluminum chloride catalyst of increasing catalytic activity containing hydrogen chloride, the aluminum chloride being rendered stationary with respect to adjacent portions by separating the catalyst from the liquors leaving each unit and recycling the catalyst through the same unit, and intermittently withdrawing spent catalyst from the first unit after it is completely exhausted, transferring the catalyst from the second unit to the first unit and from the third unit to the second unit, introducing fresh catalyst into the third unit and resuming operations.

GEORGE L. MAGOUN.

REFERENCES CITED

The following references are of record in the file of this patent:

UNITED STATES PATENTS

| Number | Name | Date |
|---|---|---|
| 2,001,909 | Ipatieff | May 21, 1935 |
| 2,198,595 | Amos et al. | Apr. 30, 1940 |
| 2,233,408 | Flett | Mar. 4, 1941 |
| 2,289,063 | Ocon et al. | July 7, 1942 |
| 2,005,861 | Ipatieff | June 25, 1935 |
| 2,161,173 | Kyrides | June 6, 1939 |
| 1,684,489 | Halloran | Sept. 18, 1928 |
| 2,073,578 | Gwynn | Mar. 9, 1937 |
| 2,348,815 | Horton et al. | May 16, 1944 |